United States Patent [19]

Yokouchi

[11] Patent Number: 5,101,343
[45] Date of Patent: Mar. 31, 1992

[54] MICROPROCESSOR WITH WORD MEMORY FOR SELECTIVELY PROCESSING DATA

[75] Inventor: Hiroshi Yokouchi, Tokyo, Japan
[73] Assignee: Electric Industry Co. Ltd.
[21] Appl. No.: 288,072
[22] Filed: Dec. 20, 1988

[30] Foreign Application Priority Data

Dec. 29, 1987 [JP] Japan .................. 62-335678

[51] Int. Cl.$^5$ .............. G06F 12/00; G06F 12/04; G06F 9/32
[52] U.S. Cl. .................. 395/425; 364/255.1; 364/955; 364/DIG. 1; 364/DIG. 2; 395/800
[58] Field of Search .......... 364/200, 900, 478, 513; 340/825.27, 825.03; 379/88, 284; 365/230.08, 230.03

[56] References Cited

U.S. PATENT DOCUMENTS

| | | | |
|---|---|---|---|
| 4,104,624 | 8/1978 | Hamada | 340/324 |
| 4,171,536 | 10/1979 | Heuer et al. | 364/200 |
| 4,237,543 | 12/1980 | Nishio et al. | 364/900 |
| 4,604,695 | 8/1986 | Widen et al. | 364/200 |
| 4,777,591 | 10/1988 | Chang et al. | 364/200 |

OTHER PUBLICATIONS

Lenk, John D.; *Handbood of Microprocessor, Microcomputers, and Mini Computers;* Prentice—Hall, Inc. 1979, pp. 71-73, 206, 270-272.

Primary Examiner—Michael R. Fleming
Assistant Examiner—Glenn A. Auve

[57] ABSTRACT

A microprocessor having a word data memory has a CPU data bus, an address register, an incrementer, a first byte data memory circuit, a second byte data memory circuit, a data input switching circuit and a data output switching circuit. The address register stores all the bit information of an address on the CPU data bus in response to a latching signal. The incrementer receives an address specifying signal as well as a logical product. The first byte data memory circuit provides a logical addition. The second byte data memory circuit receives an address specifying output. The data input switching circuit selectively transfers both word writing and byte writing data into the first and second byte data memory circuits. The data output switching circuit selectively transfers both word and byte data from the memory circuits to the CPU data bus.

10 Claims, 11 Drawing Sheets

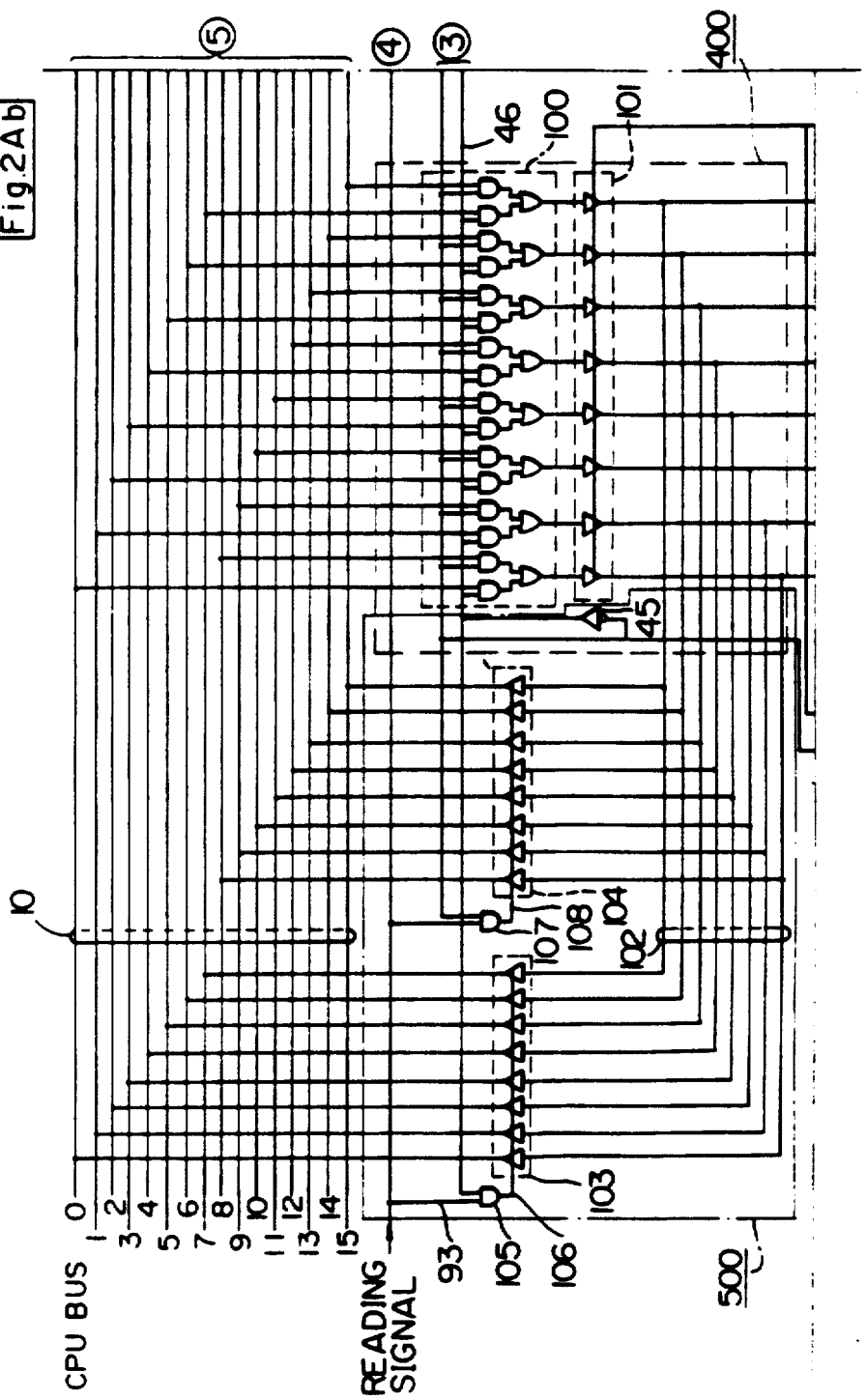

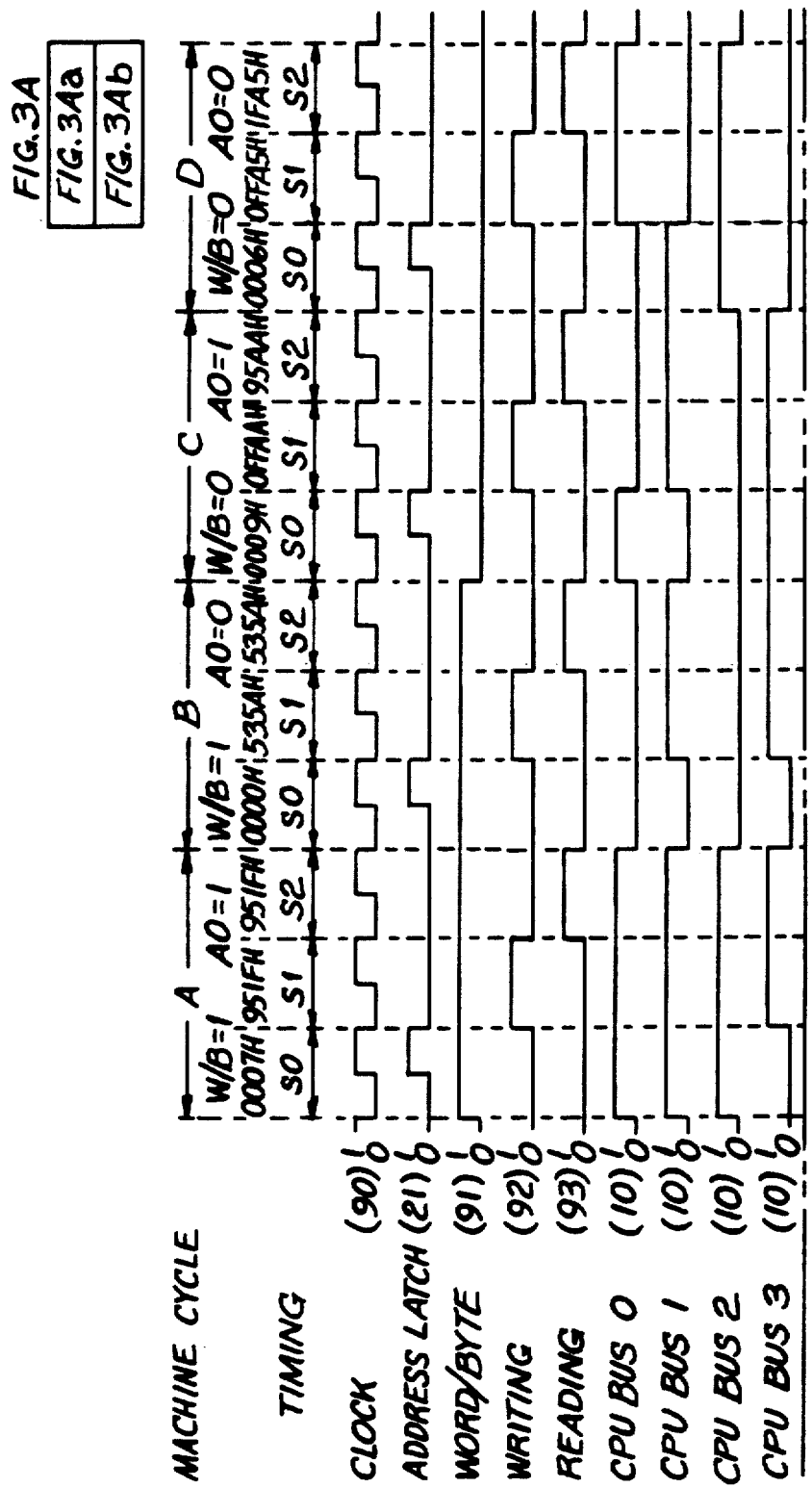

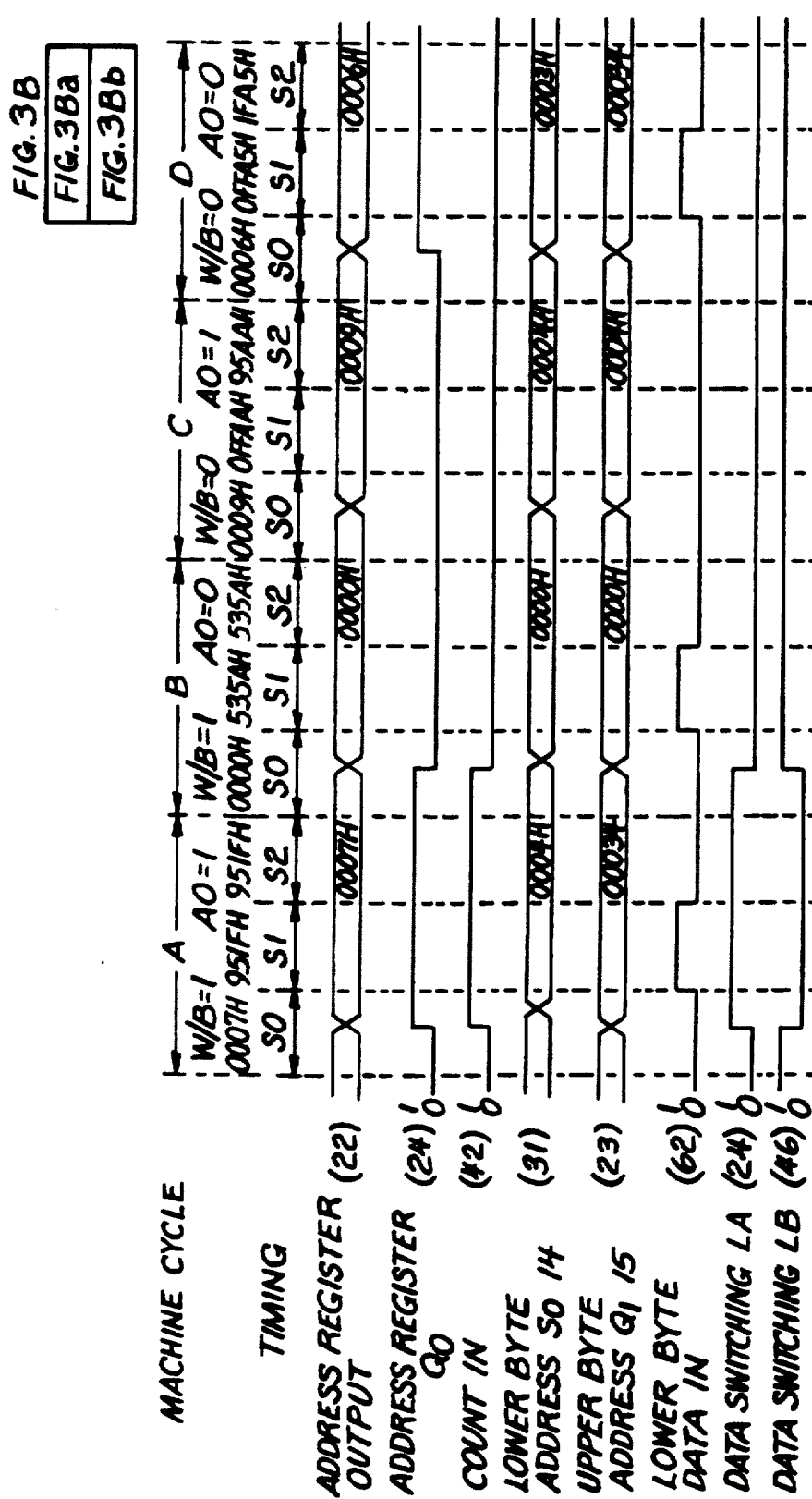

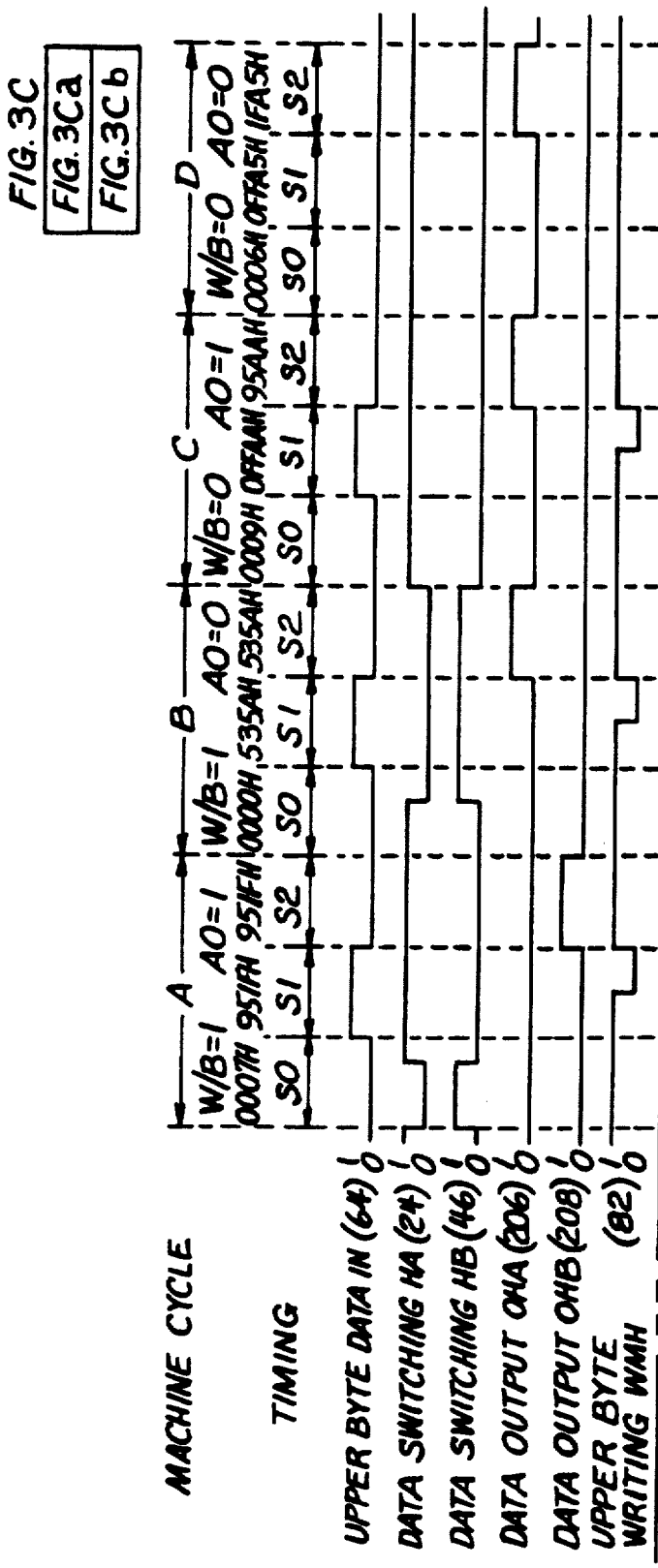

MICROPROCESSOR WITH WORD MEMORY FOR SELECTIVELY PROCESSING DATA

BACKGROUND OF THE INVENTION

This invention relates to a microprocessor, and particularly to a central processing unit (CPU) for use in a microcomputer having a word data memory.

In prior art microprocessors, in order to improve the access processing to a CPU, the word data memory may be stored with program data arranged in a word order that lower bytes or upper bytes are stored at even number addresses while upper bytes or lower bytes are stored at odd number addresses.

However, when the top lower byte (or the top upper byte) of data is stored in an odd number address, the CPU has to perform addressing twice and to access separately the lower bytes and the upper bytes. The two time memory accessing results in slow process operation.

The object of the present invention provides an improved microprocessor which makes it possible to arrange program data without taking account of memory address.

The further object of the present invention provides an improved microprocessor having word data memories which make high rate processing possible.

A microprocessor having a word data memory according to the present invention includes a CPU data bus, an address register, an incrementer, first and second byte data memories, a data input switching circuit and a data output switching circuit. The CPU data bus has higher bit lines and lower bit lines. The address register stores all the bit information of an address on the CPU data bus in response to an address latching signal. The incrementer receives an address specifying data as well as a logical product of a word/byte specifying signal and the first bit information from the address register, the address specifying data consists of all the remaining bits except the first bit from the address register. The first byte data memory forms a portion of the word data memory to provide a logical addition of the logical product from the incrementer and the address specifying signal. The second byte data memory forms the remaining portion of the word data memory to receive the address specifying output which consists of all the remaining bits except the first bit from the address register. The data input switching circuit selectively transfers into the first and second byte data memories word writing data and byte writing data on the CPU data bus by higher bit units and lower bit units. The data output switching circuit selectively provides data of the first and second byte data memories onto the higher bit lines and the lower bit lines.

BRIEF DESCRIPTION OF THE DRAWINGS

The objects stated above and other objects of the invention are set forth more particularly in the following detailed description and in the accompanying drawings, of which.

DESCRIPTION OF THE PREFERRED EMBODIMENT

An embodiment according to the present invention will be explained with reference to the accompanying drawings.

(GENERAL EXPLANATION OF FEATURES IN STRUCTURE)

Figure 1:
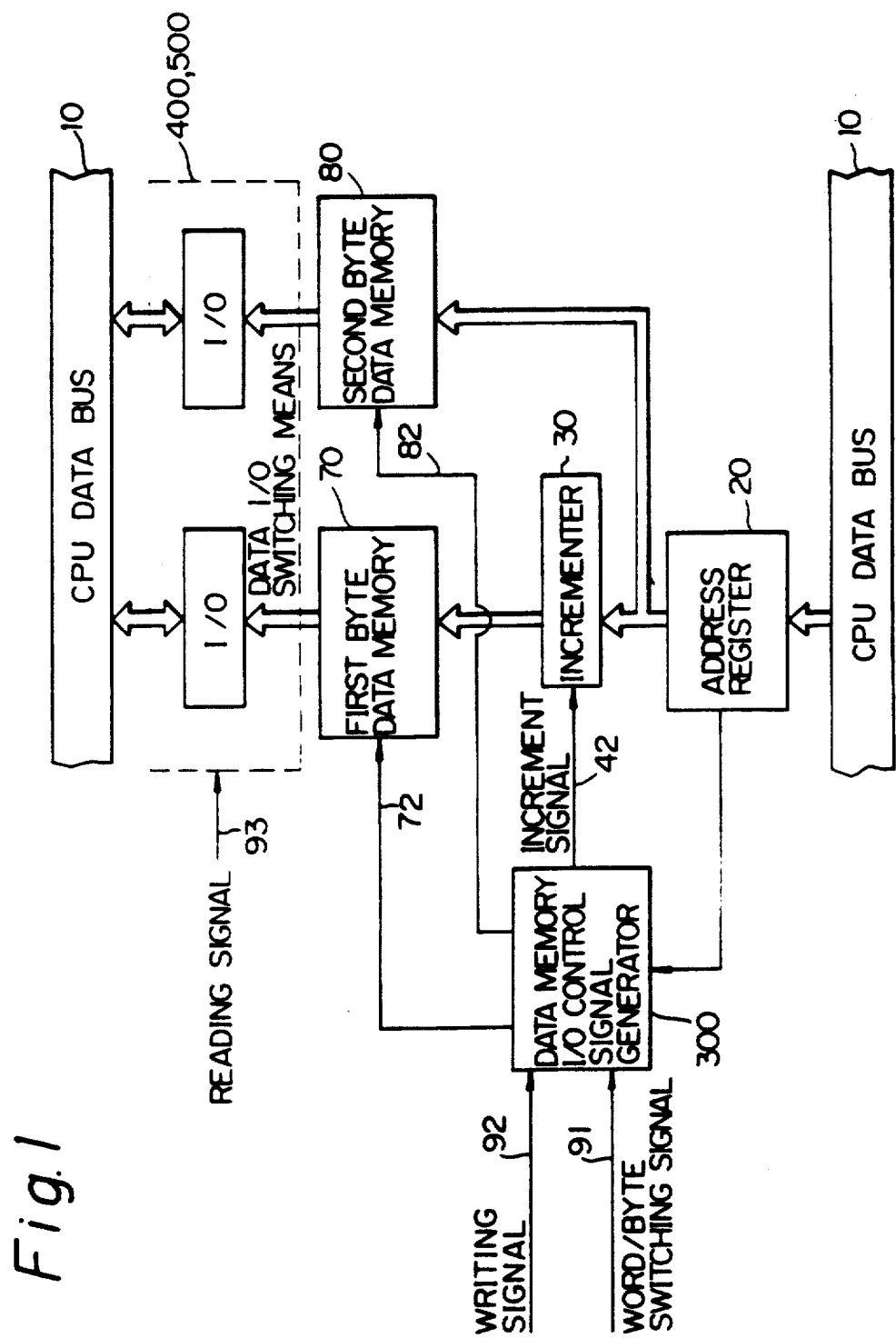
FIG. 1 is a block diagram showing general features of a microprocessor according to the present invention.

FIG. 1 shows major elements of the microprocessor of the invention.

In FIG. 1, the microprocessor includes a word data bus (or CPU bus) 10 as well as an address register 20, for example, a RAM address latching circuit, in which all the bit information constituting an address on the CPU bus are stored in response to an address latching signal.

First and second byte data memories 70 and 80 comprise a word data memory, the second byte data memory receives an address specifying signal which is formed of all the remaining bit information except the first bit sent from the address register 20.

An incrementer 30 receives an address specifying signal in addition to the logical product of a word/byte specifying signal and the first bit from the address register 20. The incrementer 30 also provides as an address the logical addition of the logical product and an address specifying data to the first byte memory 70.

A data memory input/output control signal generator 300 generates an input control signal which transfer selectively word writing data or byte writing data on the CPU bus 10 by higher and lower byte units to the first or second byte data memories 70 and 80. The generator 300 also produces an output control signal to transfer selectively data stored in the first and second byte data memories 70 and 80 to upper and lower bit lines of the CPU bus 10.

An input circuit 400 selectively transfers the writing data on the CPU bus 10 by the upper and lower byte units to the first byte data memory 70 and to the second byte data memory 80.

An output circuit 500 provides alternately the data read from both the first byte data memory 70 or the second byte data memory 80 by the lower byte and upper byte unit.

(DETAILED CIRCUIT CONNECTIONS)

Figure 2A:
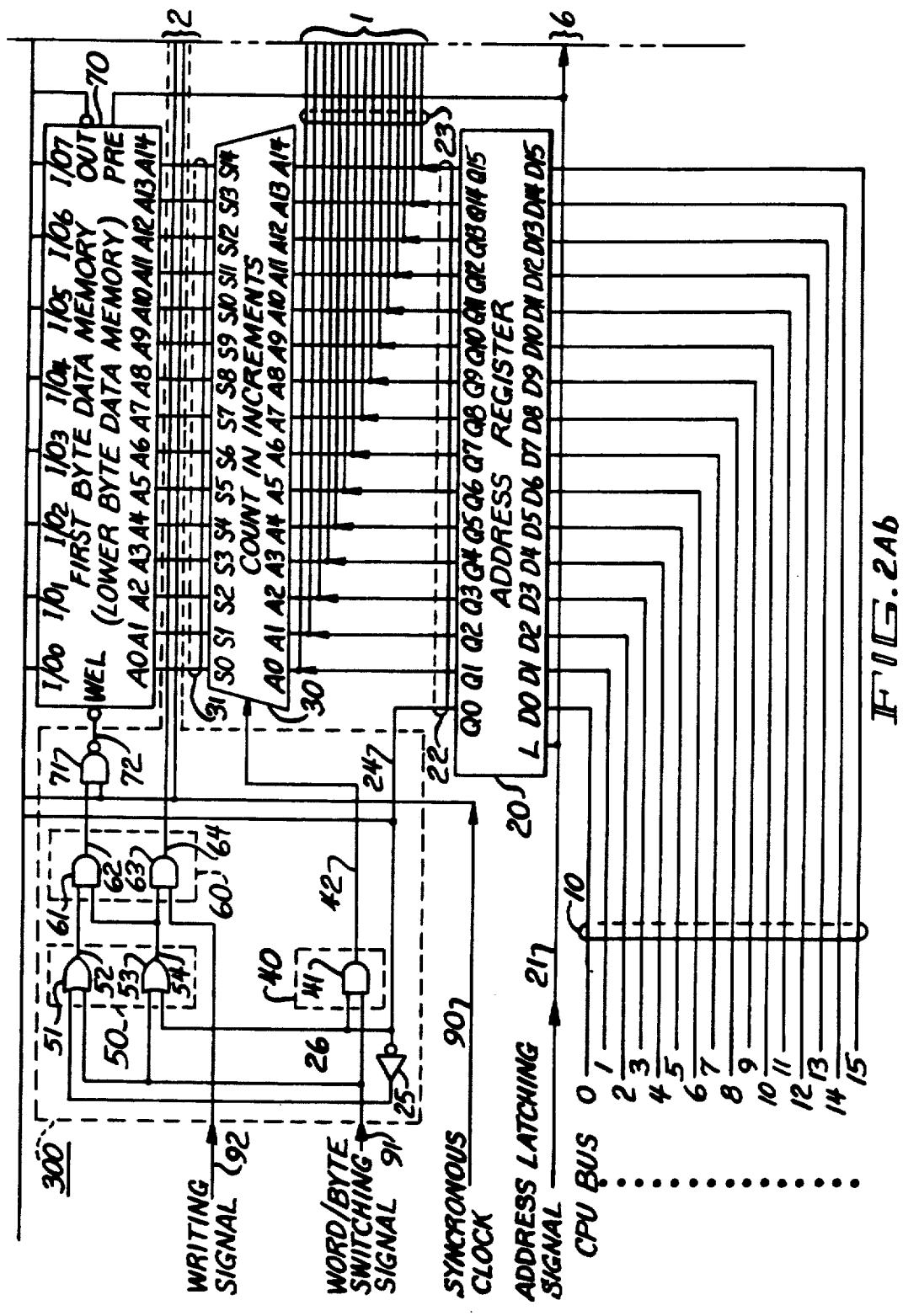
FIGS. 2A and 2B are a detailed logic diagram showing the microprocessor of FIGS. 1A and 1B.
Figure 2B:
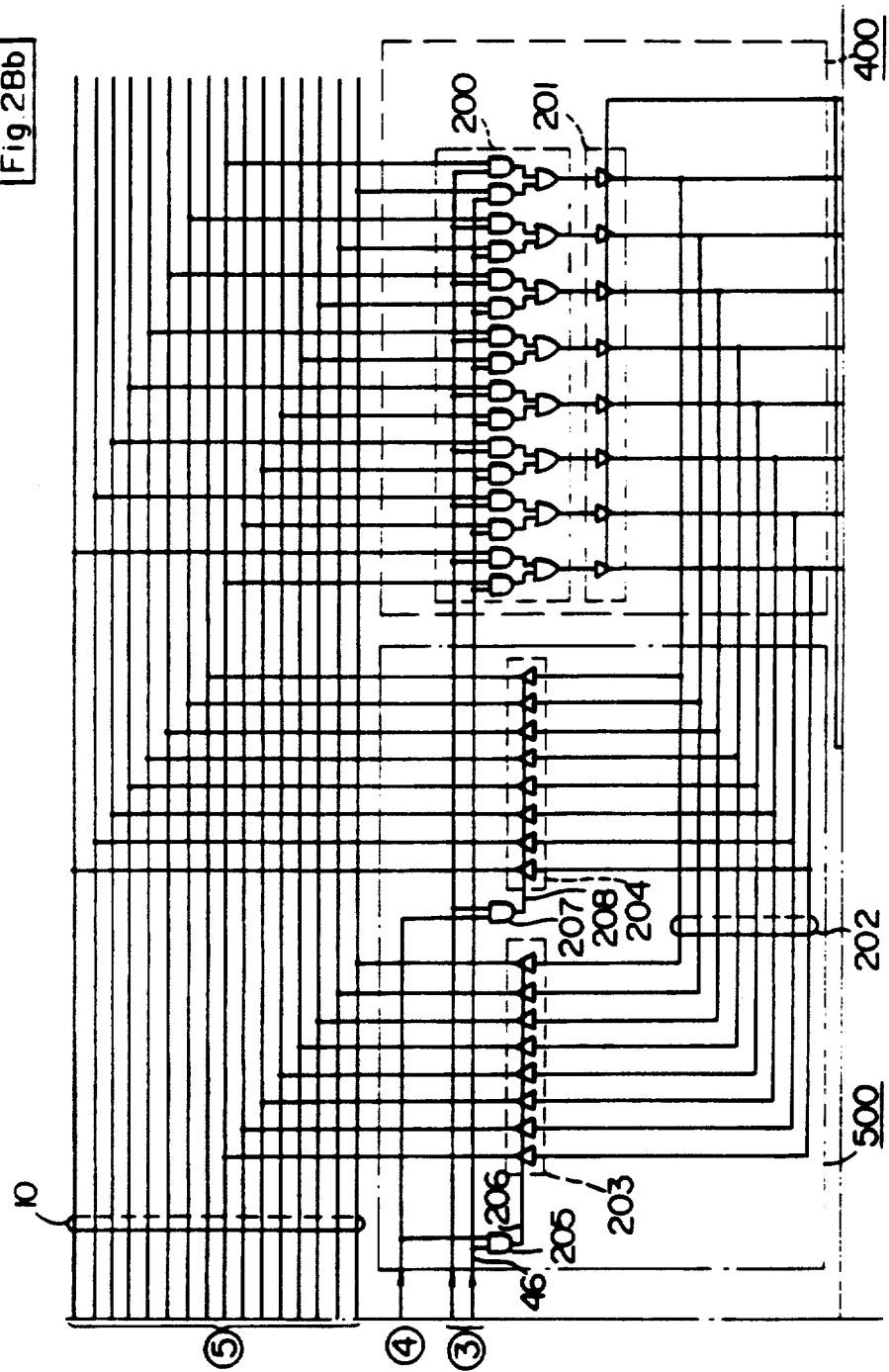
Figure 2B:
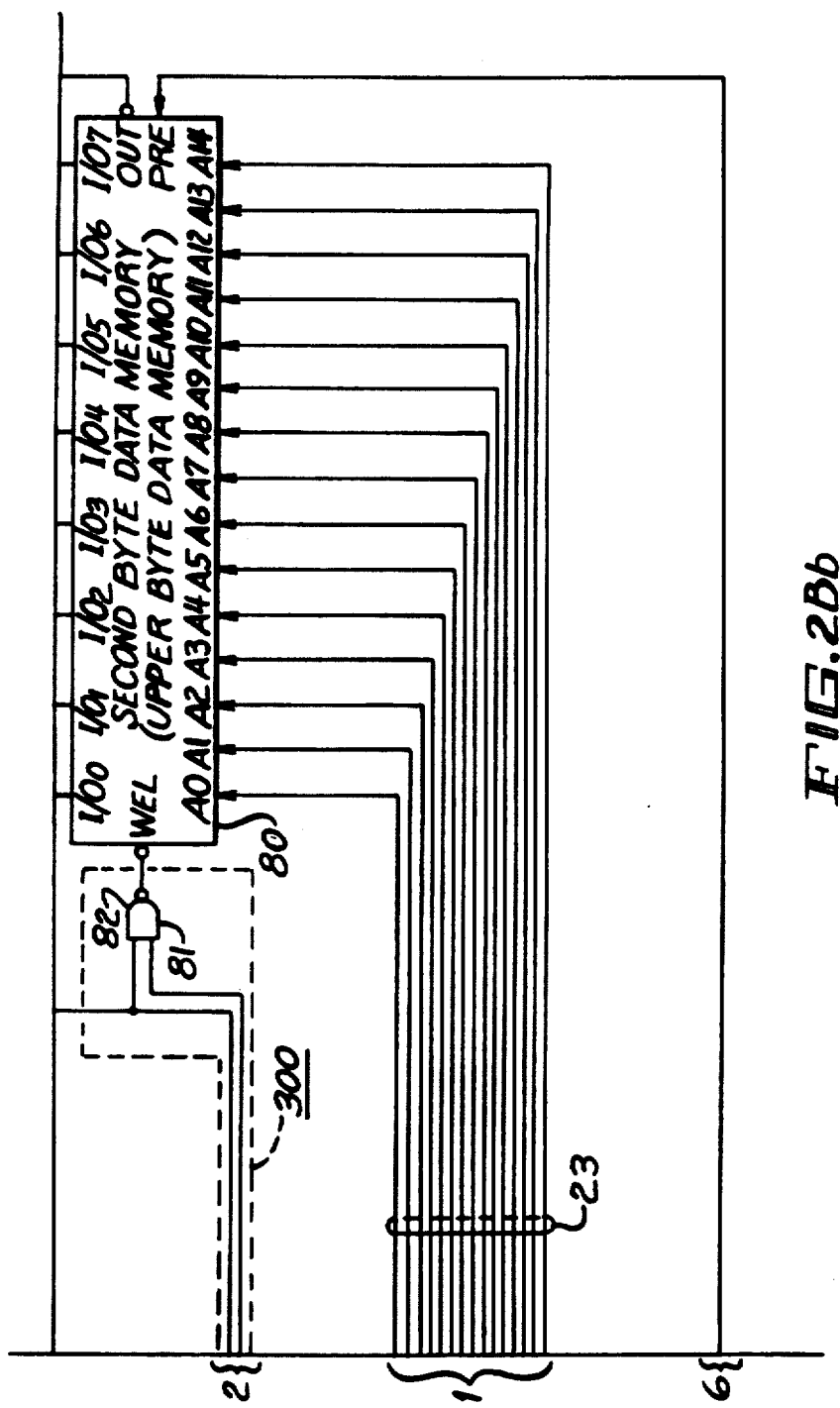

A detailed circuit configuration of a microprocessor according to the present invention will be described with reference to FIGS. 2A and 2B. In FIG. 1 and FIGS. 2A and 2B, the same numerals represent the same elements. In the following text, reference is made to both signals and to the lines carrying those signals. A single reference numeral in many cases will be used to designate both the signal and the line carrying it, thereby to avoid the undue multiplication of reference numerals throughout this description. For example, if reference is made to "22" this denotes the line itself or the signal or data (or datum) that is carried on a line 22.

In FIGS. 2A and 2B, the CPU bus has sixteen lines $S_0$ through $S_{15}$ which transmit data processed in the CPU. The Figures show these as CPU bus lines 0 through 15. The address register 20 is shown with a latch input L, a set of "D" inputs D0 through D15, and a set of "Q" outputs Q1 through Q15. Latch input L is coupled to a signal line 21 used to convey an address latching signal from time to time. The sixteen "D" inputs are coupled to respective ones of the sixteen lines of the data bus 10. Address register 20 stores as a data memory specifying address all the bit information on the CPU buses $S_0$ to $S_{15}$ when there is an address latching signal on line 21. The output signals $Q_0$ to $Q_{15}$ are, for example, a 16 bit signal sent from the address register 20. The sixteen bit output signal Q from address register 20 is divided or handled in two distinct groups. A first group consists of the output Q0 applied to a line 22; the second group consists of the outputs Q1 through Q15 applied to a bus or set of lines 23. Thus it will be appreciated that the output signals 23 are all the remaining bit information except the first bit from the address register 20 and act as a base of address to specify the data memories 70 and 80. Line 22 coupled to the output Q0 is applied as an input on a line 24 of the data memory input/output control signal generator 300 and may be used as a data input switching signal, a data memory data output signal, a data address generating signal, etc. for the data memory 70 and 80. An inverter gate 25 provides an inverted signal $Q_0$ BAR on a line 26 of an output signal $Q_0$ on line 24.

The incrementer (or adder) 30 may comprise for example, a +1 incrementer, is coupled to receive the fifteen address signals Q1 through Q15 on inputs A0 through A14. Incrementer 30 also includes a set of fifteen S outputs marked as S0 through S14. A further input to incrementer 30 is a line 42 from I/O control signal generator 300. Note that the address register output Q0 on line 22 is not applied directly to incrementer 30, but instead is used as one of two inputs to a logic circuit 40 within generator 300. The second input to logic circuit 40 is a word/byte switching signal on a line 91. This signal on line 42 is referred to as a logical product signal (also referred to as an incremental signal or a +1 addition signal). An address signal 31 is the output signals $S_0$ through $S_{14}$ from the incrementer 30 and specifies an address in a lower byte data memory 70. A clock signal 90 supplied to the data input/output control circuit 300 is used as a synchronous clock for writing the memory data. A word/byte signal 91 specifies whether a data width for the data memory 70 or 80 used to process the CPU is in byte (ex. 8 bit) or word (ex. 16 bit) length. A writing signal 92 is provided to the data input/output control circuit 300 in a data writing operation to the data memory 70 or 80. A reading signal 93 is supplied to the data output circuit 500 in reading data out of the data memories 70 and 80.

In the input/output control signal generator 300, a logical circuit 40 is, for example, a two input AND gate 41 and provides a +1 addition signal 42 to the incrementer 30 when it receives a word/byte signal 91 and an output signal $Q_0$ (or 24) from the address register 20. An logical circuit 50 is formed of, for example, two-input OR gates 51 and 53 and outputs both a lower byte data memory specifying signal 52 and a upper byte data memory specifying signal 54 in response to the word-/byte signal 91, the address register output $Q_0$ and the inverter signal $Q_0$ BAR on line 26. A logical circuit 60 is formed of, for example, two-input AND gates 61 and 63 and provides, in response to the signals 52 and 54 and a writing signal 92, a control signal 62 for inputting or writing data into the lower byte data memory 70 and a control signal 64 for inputting or writing data into the upper byte data memory 80.

The first byte data memory 70, which is a lower byte data memory in this embodiment, is a part of the word data memory to store byte data. The second byte data memory 80, which is an upper byte data memory in this embodiment, is the remaining portion of the word data memory to store bite data. A logical circuit 71 is, for example, a two-input AND gate, and provides a writing signal to the lower byte data memory 70 when it receives a lower byte writing signal 62 and a clock signal 90. A logical circuit 81 is, for example, a two-input NAND gate. When both a writing signal 64 and a clock signal 90 are inputted to the circuit 81, a writing signal 82 is output to the second byte data memory 80.

In a data input switching circuit 400, a logical circuit 100 inputs into the lower byte data memory 70 the lower byte data $D_0$ to $D_7$ selected among the data $D_0$ to $D_{15}$ written on the CPU bus 10. A three state circuit 101 is connected to transmit the written data from the logical circuit 100 to the lower byte data memory bus 102. An inverter gate 45 switches the data input operation to the byte data memory and outputs an inverted signal 46 of a control signal 24 for specifying data output to a data memory. It will be noted from the Figures that the output of inverter 45 is coupled to gates within logic circuits 100 and within a similar logic circuit 200, and to logic gates 105 and 206 described infra.

An arithmetic logical circuit 200 inputs to the upper byte data memory 80 the upper byte data $D_8$ to $D_{15}$ by selectively switching the lower byte data and the upper byte data loaded on the CPU bus 10. A three state gate 201 transmits the written data from the circuit 200 to the upper byte data memory bus 202.

As seen from the above explanation, the data switching circuit 400 comprises inverter gates 25 and 45, logical circuits 40, 50, 60, 71, 81, 100 and 200, and three state gates 101 and 201. However, the structure of the circuit 400 should not be restricted to the present embodiment and it will be possible to realize various modifications thereof.

Next, a data output switching circuit 500 will be explained.

A three state gate 103 transmits the data read from the lower byte data memory 70 to the CPU buses 0 to 7. A three state gate 104 transmits the data read from the lower byte data memory 70 to the CPU buses 8 to 15. The inverter 45 outputs an inverted signal 46.

A logical circuit 105 is of, for example, a two-input NAND gate and provides a switching signal 106 to the three gate circuit 103 in response to both a reading signal 93 and the reversed signal 46 of the output signal $Q_0$ from the address register 20.

A two-input NAND gate circuit 107 as a logical circuit outputs a switching signal 108 to a three state gate 104 when it receives a reading signal 93 and an output signal $Q_0$ of the address register 20.

A three state gate 203 transmits the data read from the upper byte data memory 80 to the CPU buses 0 to 7. A three state gate 204 sends the data read from the upper byte data memory 80 to the CPU buses 8 to 15.

A logical circuit 205 is of, for example, a two input NAND gate outputs a switching signal 206 to the three state gate 203 in response to a reading signal 93 and an inverted signal 46 of the output signal $Q_0$ from the address register 20. A logical circuit 207 is of, for example, a two input NAND gate and provides a switching signal 108 to the three state gate 204 when a reading signal 93 and the output signal $Q_0$ of the address register 20 are input to the circuit 207.

As understanded the above description, the data output switching circuit of the embodiment comprises the logical circuits 105, 107, 205 and 207, the three state circuits 103, 104, 203 and 204, and the inverter 45.

OPERATION

An operation of the embodiment according to the present invention will be explained with reference to timing charts shown in FIGS. 3A to 3C.

Figure 3A:
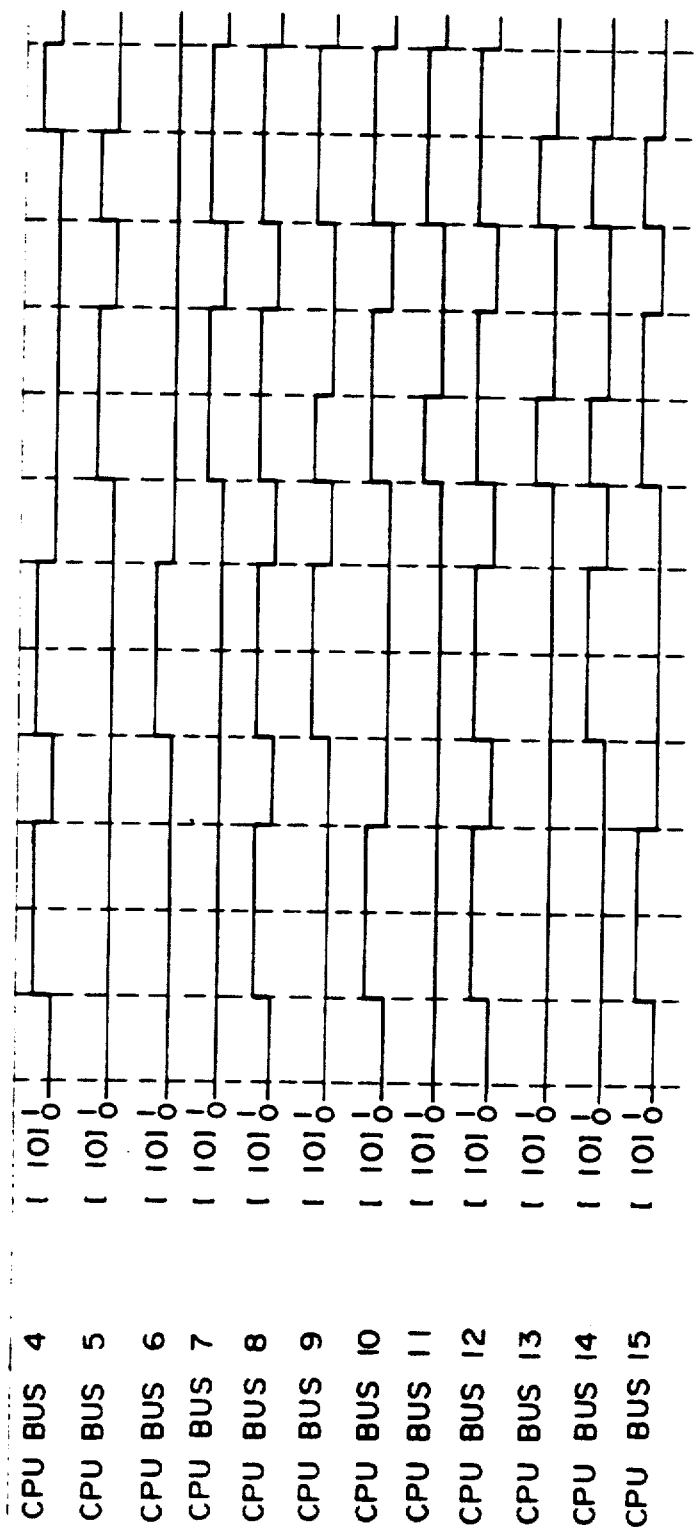
FIG. 3A, 3B and 3C are timing charts for explaining operation of the microprocessor shown in FIGS. 2A and 2B.
Figure 3B:
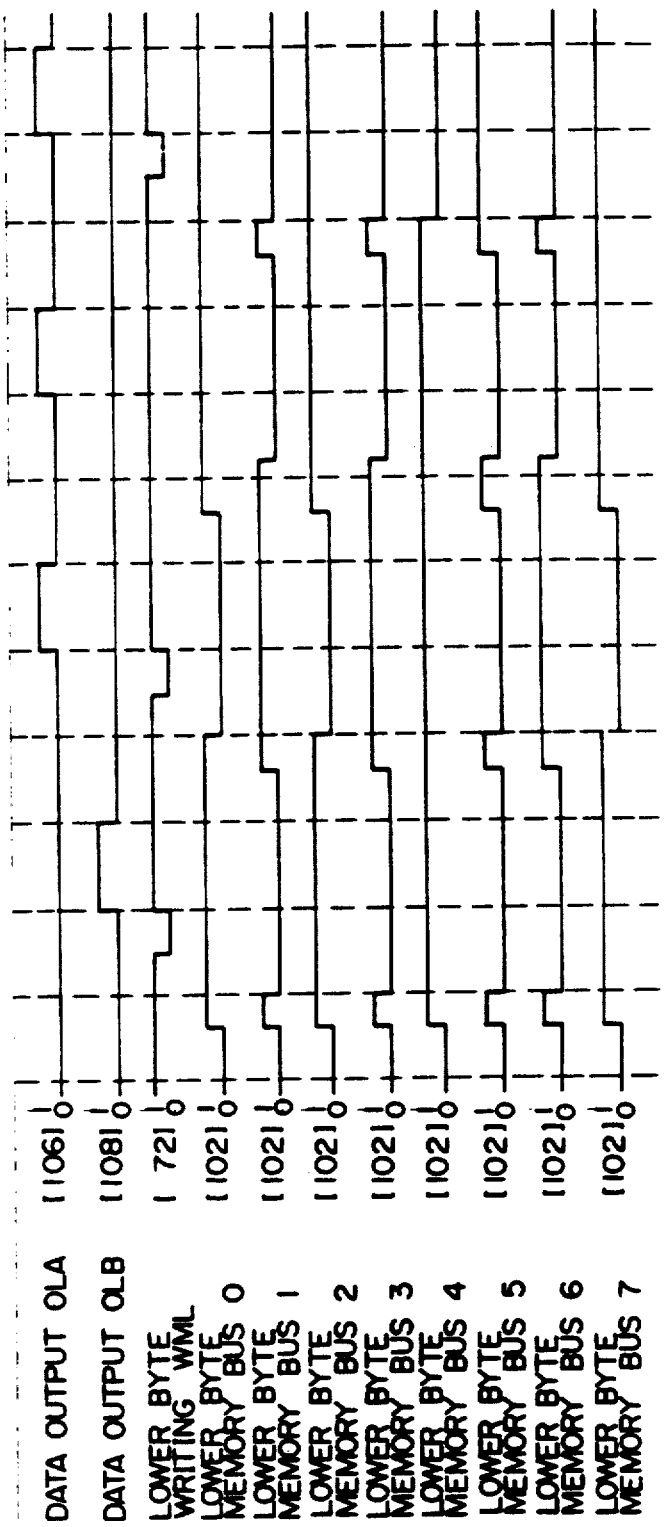
Figure 3C:
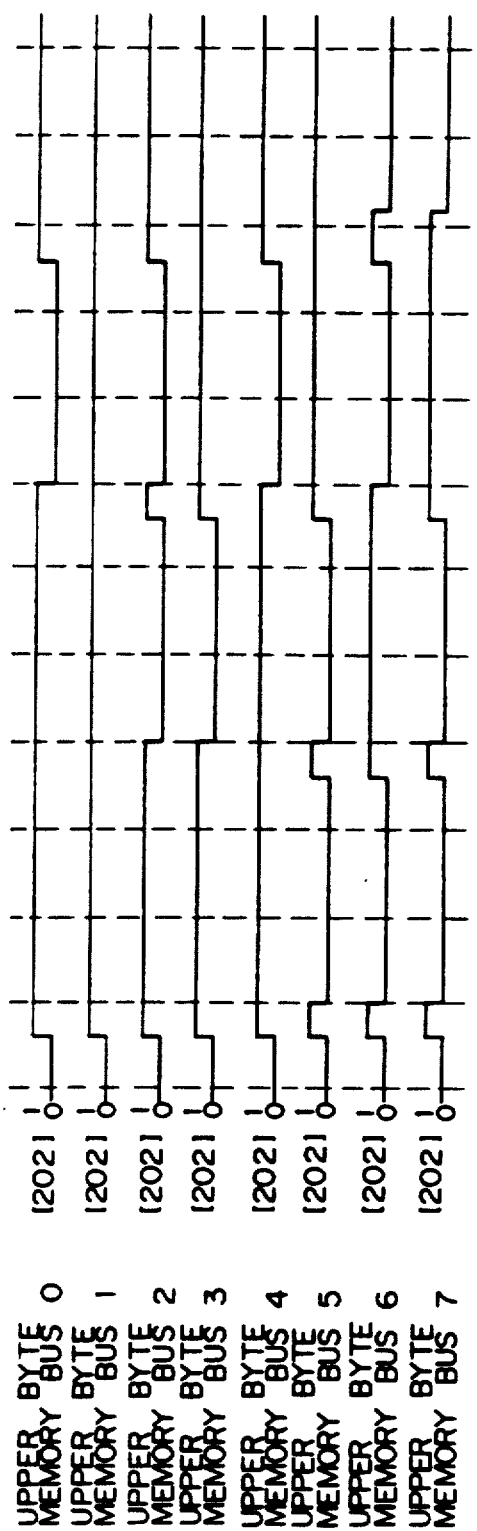

FIGS. 3A through 3C include letters A, B and C showing machine cycles, W/B=1 meaning word selection, and W/B=0 meaning byte selection. A0=1 means odd number address selecting operation and A0=0 means even number address selection operation and S0, S1 and S2 represent timings in machine cycles of CPU. For example, the machine cycle A shows writing and reading operations to the data memory 70 or 80 of a word (for example, of a width of 16 bits) in which the head address is of odd number. The machine cycle B shows the writing and reading operations to the byte data memory 70 or 80 including word data (for example, a width of 16 bits) each in which the head address is of even number. The machine cycle C shows writing and reading operations to the byte data memory 70 or 80 including words (for example, a width of 8 bits) each in which the head address is of odd number. The machine cycle D shows the writing and reading operations to the byte data memory including bite data (for example, a width of 8 bits) each in which the head address is of odd number. Figures in the brackets of FIGS. 3A to 3C are reference numerals seen in FIGS. 2A and 2B.

Now, let us assume that the data memories stored data seen in the following Table I.

TABLE I

| Byte Address | Byte Data | Word Address | Upper Byte Data | Lower Byte Data |
|---|---|---|---|---|
| 0000H | 00H | 0000H | 00H | 00H |
| 0001H | 00H | | | |
| 0002H | 00H | 0002H | 00H | 00H |
| 0003H | 00H | | | |
| 0004H | 00H | 0004H | 00H | 00H |
| 0005H | 00H | | | |
| 0006H | 00H | 0006H | 00H | 00H |
| 0007H | 00H | | | |
| 0008H | 00H | 0008H | 00H | 00H |
| 0009H | 00H | | | |
| FFFEH | 00H | FFFEH | 00H | 00H |
| FFFEH | 00H | | | |

The machine cycle A seen in FIGS. 3A, 3B and 3C, is the operational mode that a word data (of a width of 16 bits) is written into or read out of an address in a head odd number address (for example, 0007H).

In the state $S_0$, the data memory specifying address 1110000000000000 is loaded to the CPU buses $S_0$ to $S_{15}$, and the address register 20 outputs the address data 0007H when it receives an address latching signal 21 in a later portion of the state $S_0$. The address register 20, for example, provides an address signal 23 which specifies the address 0003H of the upper byte data memory 80. The incrementer 30 produces an addition signal of an increment signal (or +1 addition signal) 42 and an address signal 23 to specify an address of the lower byte data memory 70. In this case, since it receives both a word/bite specifying signal 91 of "1" and a signal 24 (or the first bit information $Q_0$ of the address register 20) of "1", the logical circuit 40 produces an increment signal of a logical "1". The incrementer 30 generates to the lower byte data memory 70 an address of the +1 addition signal plus the address for the upper byte data memory being the remaining bit information $Q_1$ to $Q_{15}$. Therefore, the lower byte data memory 70 is specified to the address of 1+0003H=0004H.

In the state $S_1$, the data 1111100010101001 (or 951FH in hexadecimal notation expressed from the upper bit order) for writing are loaded onto the CPU buses $S_0$ to $S_{15}$ In the word data preceded by an odd number address, the byte data at the head address take the lower place and the following byte data at the following address (or the head address plus 1) take the upper place. For example, the data 951F consist of 95H taking the upper place and 1FH taking the lower place. The 1FH data are stored in the upper byte data memory 80 while the 95H data are stored in the lower byte data memory 70. When the logical circuit 300 receives an data switching signal LA (or 24) of a "1" level in the later part of the state $S_0$, the logical circuit 100 transfers the 95H data on the CPU buses $S_0$ to $S_{15}$ into the lower byte data memory 70 during the state $S_1$. While the logical circuit 200, which receives an input switching signal HA (or 24) of a "1" level in the later part of the state $S_0$, transfers the 1FH data on the CPU buses $S_0$ to $S_{15}$ to the upper byte data memory 80 during the state $S_1$. When the gate switching signals 62 and 64 become a "1" level during the state $S_1$, the three state gates 101 and 201 load the 95H data on the CPU buses $S_8$ to $S_{15}$ into the lower byte memory buses 0 to 7 (or 102) and the 1F data of the CPU buses $S_0$ to $S_7$ into the upper byte data memory buses 0 to 7 (or 202), respectively.

When the clock signal 90 turns "0" to "1" in the later part of the state $S_1$ and both the lower byte writing signal WML (or 72) and the upper byte writing signal WMH (or 82) turns "1" to "0", the data are stored in the arrangement shown in the following Table II.

TABLE II

| Byte Address | Byte Data | Word Address | Upper Byte Data | Lower Byte Data |
|---|---|---|---|---|
| 0000H | 00H | 0000H | 00H | 00H |
| 0001H | 00H | | | |
| 0002H | 00H | 0002H | 00H | 00H |
| 0003H | 00H | | | |
| 0004H | 00H | 0004H | 00H | 00H |
| 0005H | 00H | | | |
| 0006H | 00H | 0006H | *1FH | 00H |
| 0007H | *1FH | | | |
| 0008H | *95H | 0008H | 00H | *95H |
| 0009H | | | | |

*Written data shown in this present embodiment.

As seen in the Table II, in byte address arrangement of the 951FH data, the 1FH data are stored in the 0007H address and the 95H data are stored in the 0008H address. On the other hand, in word address arrangement of the 951FH data, the 1FH data are stored in the 0006 address of the upper byte data memory 80 and the 95H data are stored in the 0008 address of the lower byte data address 70.

When the reading signal 93 becomes a "1" level in the state $S_2$, the data which has been written in the state $S_1$ in the address specified during the state $S_0$ are loaded onto the CPU buses 0 to 15. In case word data (of 16 bits) of a head odd number address are read, the byte data at the head address takes the lower place and the byte data at the following address takes the upper place. During the state $S_2$, the upper byte memory 80 provides the data onto the CPU buses $S_0$ to $S_{15}$, when the reading data output signal OHB (or 208) is at a "1" level. The lower byte data memory 70 provides the data onto the CPU buses $S_8$ to $S_{15}$ when the data reading output signal OLB (or 108) becomes "1" level. Therefore, the CPU buses $S_0$ to $S_{15}$ are in 1111100010101001.

Next, an operation for reading and writing word data (of 16 bits) into an address preceded by even number address during the machine cycle B will be explained.

In the state $S_0$ of the machine cycle B, the data memory specifying address 0000000000000000 are supplied onto the CPU buses $S_0$ to $S_{15}$. When the address register 20 receives the address latching signal 21 in the later part of the state $S_0$, it outputs the data 0000H as an output signal 22. Also the data 0000H as an address signal 23 (or output bits $Q_1$ to $Q_{15}$) are output to specify the upper byte data memory 80. The incrementer 30 receives both an incremental signal (or +1 addition signal) 42 from the control signal generator 300 and an address signal 23 from the address register 20 to output an addition signal which is the address data for specifying the lower byte data memory 70. When the word-/byte specifying signal 91 is a "1" level and the first bit position information $Q_0$ or the output signal 24 from the register 20 is in a "0" level, the incremental signal 42 to the incrementer 30 becomes a "0" level. As a result, the lower byte data memory 70 is specified to the same address 0000H as that of the upper byte data memory 80.

In the state $S_1$, the CPU buses $S_0$ to $S_{15}$ are supplied with the writing data 0101101011001010 (or 535AH in hexadecimal notation expressed from the upper bit order).

In the word data preceded by even addresses, the lower byte data take the lower position and the upper byte data take the upper position. When the logical circuit 100 receives a data switching signal LB or 46 of a "1" level, it transfers the data 5AH of the CPU data buses $S_0$ to $S_7$ to the lower byte memory buses 0 to 7 (or 102). On the other hand, the logical circuit 200 receives a data switching signal HB 46 of a "1" level, it sends the data 53H of the CPU data buses $S_8$ to $S_{15}$ into the upper byte memory bus $S_0$ to $S_7$ (202).

In the later part of the state $S_1$, when the clock signal turns "0" to "1" and the lower and upper byte data memory writing signals WML (or 72) and WMH (or 82) turn "1" to "0", respectively, the data are written in the byte data memories 70 and 80 in the arrangement as shown in Table III.

TABLE III

| Byte Address | Byte Data | Word Address | Upper Byte Data | Lower Byte Data |
|---|---|---|---|---|
| 0000H | *5AH | 0000H | *53H | *5AH |
| 0001H | *53H | | | |
| 0002H | 00H | 0002H | 00H | 00H |
| 0003H | 00H | | | |
| 0004H | 00H | 0004H | 00H | 00H |
| 0005h | 00H | | | |
| 0006h | 00H | 0006H | 1FH | 00H |
| 0007H | 1FH | | | |
| 0008H | 95H | 0008H | 00H | 95H |
| 0009H | 00H | | | |

*Written data shown in this present invention.

As seen in the Table III, in byte address arrangement of the 535AH data, the 5AH data are stored in the address 0000H while the 53H data are stored in the address 0001H. In word address arrangement of the 535AH data, the 5AH data are stored in the address 000H of the lower byte data memory 70, while the 53H data are stored in the address 0000H of the upper byte data memory 80.

In the state $S_2$, when the reading signal 93 turns to "1", the data written during the state $S_1$ into the address specified during the state $S_0$ are loaded onto the CPU data buses $S_0$ to $S_{15}$.

In case word data (of 16 bits) of the head even number address are read out, the content of the lower byte data memory 70 occupies the lower position of the word specifying address, while the content of the upper byte data memory 80 occupies the upper position thereof. In the state $S_2$, when the data output signal OLA (or 106) is in "1", the lower byte data memory 70 provides readout data onto the CPU data buses $S_0$ to $S_7$. Since the data output signal OAH (or 206) is in "1", the upper byte data memory 80 provides readout data onto the CPU data buses $S_8$ to $S_{15}$. Therefore, the CPU data buses $S_0$ to $S_{15}$ are in 0101101011001010.

Next, it will be expressed that bite (8 bits) data are written into a head odd number address in the machine cycle C.

In the state $S_0$ of the machine cycle C, the address data 1001000000000000 are provides onto the CPU data buses $S_0$ to $S_{15}$ to specify the data memory. When the address register 20 receives an address latching signal 21 during the later part of the state $S_0$, it outputs data 0009H. The address signal 23 specifies the address 0004H which is a specifying address for the upper byte data memory 80. The specifying address for the lower byte data memory 70 is an addition value of the increment signal (or +1 addition signal) 42 and the address signal 23. The word/bite specifying signal 91 is in "0" to perform a byte processing and the incrementer 30 receives an increment signal 42 of "0". For this reason, the lower byte data memory 70 is specified to the same address of 0004H as that of the upper byte date memory 80.

In the state $S_1$, the CPU data buses $S_0$ to $S_{15}$ are provided with the writing data of 0101010111111111 (or 0FFAAHH in Hexadecimal notation). In this case, the data OFFAAH on the CPU data buses $S_8$ to $S_{15}$ are "1"s which are obtained by precharging the CPU data buses $S_0$ to $S_{15}$. When byte data are written into the byte data memory 70 or 80, it is stored in only a specified byte data memory address, but an unspecified byte data memory address. When the logical circuit 50 receives a word/bite specifying signal 91 of "0", the first bit signal $Q_0$ (or 24) of "1" from the address register 20 becomes valid. The OR gate 53 receives the first bit signal $Q_0$ and the output signal 54 selects the upper byte data memory 80. The logical circuit 200 also receives the bit signal 24 of "1" so that the OAAH data on the CPU data buses $S_0$ to $S_7$ are loaded onto the upper byte data memory buses $S_0$ to $S_7$ (or 202).

In the later part of the state $S_1$, when the clock signal 90 turns "0" to "1", the writing signal WMH (or 82) goes "1" to "0". The data are written into the upper byte data memory 80 in the arrangement as seen in the following Table IV.

TABLE IV

| Byte Address | Byte Data | Word Address | Upper Byte Data | Lower Byte Data |
|---|---|---|---|---|
| 0000H | 5AH | 0000H | 53H | 5AH |
| 0001H | 53H | | | |
| 0002H | 00H | 0002H | 00H | 00H |
| 0003H | 00H | | | |
| 0004H | 00H | 0004H | 00H | 00H |
| 0005H | 00H | | | |
| 0006H | 00H | 0006H | 1FH | 00H |
| 0007H | 1FH | | | |
| 0008H | 95H | 0008H | *AAH | 95H |

TABLE IV-continued

| Byte Address | Byte Data | Word Address | Upper Byte Data | Lower Byte Data |
|---|---|---|---|---|
| 0009H | *AAH | | | |

*Written data shown in the present invention.

As seen in the Table IV, the 0AAH data are stored in the byte address 0009H and the OAAH data are stored in the upper byte date memory 80.

In the state $S_2$, when the reading signal 93 turns to "1", the data written during the state $S_1$ into the address specified during the state $S_0$ are read out to the CPU data buses $S_0$ to $S_7$.

In a byte data reading operation, the byte data in a specified address are read out onto the CPU data buses $S_0$ to $S_7$ and the content in a byte specifying address of the byte data memory 70 are read out onto the CPU data buses $S_8$ to $S_{15}$. When the three state gate 208 receives a data output signal OHB (or 208) in the state $S_2$, the upper byte data memory 80 outputs the read data onto the CPU data buses $S_0$ to $S_7$. When the three state gate 108 receives a data output signal OLB (or 108), the lower byte data memory 70 provides the read data onto the CPU data buses $S_8$ to $S_{15}$. As a result, the bit information on the CPU data buses $S_0$ to $S_{15}$ becomes 0101010110101001.

Next, the reading and writing operations of byte (8 bits) data into an address preceded by an even address will be explained based on the machine cycle D.

When the address data 0110000000000000 occur on the CPU data buses $S_0$ to $S_{15}$ in the state $S_0$ of the machine cycle C and an address latching signal 21 is input to the address register 20 in the later part of the state $S_0$, the address register 20 provides the data 0006H. The address signal 23 represents the data 0003H and specifies the upper byte data memory 80. The addressing for the lower byte data memory 70 is determined an addition value of an increment signal 42 and an address signal 23. In this case, the word/bite signal is "0" because of the bite processing so that the address specifying the lower byte data memory 70 is 0003H which is the same as that of upper byte data memory 80.

In the state $S_1$, the writing data 10100101111111111 which is referred to OFFA5H in Hexsadecimal notation are supplied onto the CPU data buses $S_0$ to $S_{15}$. In this case, the data on the CPU data buses $S_0$ to $S_{15}$ are "1" levels which are obtained by precharging the data buses $S_0$ to $S_{15}$.

In the byte data writing operation, the data are stored into the byte data memory 70 or 80 corresponding to a specified address and new data are not stored into the unspecified byte data memory 80 or 70. The output signal $Q_0$ becomes valid since the data memory selection circuit 50 receives a word/bite specifying signal 91 of "0". The gate 51 outputs a signal $Q_0$ of "1" to select the lower byte data memory 70. On the other hand, the gate 53 outputs a signal of "0" but it does not select the upper byte data memory 80.

In the state $S_1$, the logical circuit 100 transfers through the three state gate 101 the data on the CPU data buses $S_0$ to $S_7$ selected by the selection signal 46 from the inverter 45 to the bus 102 of the lower byte data memory 70.

In the later part of the state $S_1$, when the clock changes from "1" to "0" and then the writing signal WML (or 72) changes from "1" to "0", the data in arrangement seen in the following Table V are stored in the lower byte data memory 70.

TABLE V

| Byte Address | Byte Data | Word Address | Upper Byte Data | Lower Byte Data |
|---|---|---|---|---|
| 0000 | 5AH | 0000H | 53H | 5AH |
| 0001 | 53H | | | |
| 0002 | 00H | 0002H | 00H | 00H |
| 0003 | 00H | | | |
| 0004 | 00H | 0004H | 00H | 00H |
| 0005 | 00H | | | |
| 0006 | *A5H | 0006H | 1FH | *A5H |
| 0007 | 1FH | | | |
| 0008 | 95H | 0008H | AAH | 95H |
| 0009 | AAH | | | |

*Written data shown in the present invention.

As seen from the Table V, the A5H data are stored into the byte address 0006 which corresponds to the word address of 0006H in the lower byte data memory 70.

In the state S2, when the reading signal 93 is "1", the data written during the state $S_1$ in the address specified during the state $S_0$ are read onto the CPU data buses $S_0$ to $S_7$.

In the byte data reading operation, the CPU data buses $S_0$ to $S_7$ receives the byte data read from a specified address while the CPU data buses $S_8$ to $S_{15}$ receives the content from a word address as a byte specifying address of the byte data memory 70 or 80. Therefore, the data output signal OLA (or 106) becomes "1" in the state S2 so that the data read out onto the CPU data buses $S_0$ to $S_7$. Then the data output signal OHA (or 206) changes into "1", the upper byte data memory 80 outputs the read data onto the CPU data buses $S_8$ to $S_{15}$. As a result, the CPU data buses $S_0$ to $S_{15}$ are in 1010010111111000.

As described above, the microprocessor according to the present invention includes a word data memory which comprises an upper byte data memory and an lower byte data memory. The improved microprocessor also has an incrementer which produces an address for specifying the lower byte data memory and which enable an access operation by only one time addressing. The microprocessor of this invention is applicable to CPU memory systems which require high speed processing.

What is claimed is:

1. A microprocessor having a word data memory, said microprocessor comprising:
 a CPU data bus having a plurality of first bit lines and second bit lines, the data bus having sufficient lines to carry an address signal having multiple bits;
 an address register having inputs coupled to the CPU data bus, for storing all bits of an address signal on the CPU data bus in response to an address latching signal, the address register having outputs providing a first bit and remaining bits, the remaining bits comprising address specifying data;
 a control circuit coupled to receive said first bit and a switching signal, the control circuit being operative to provide a logic combination of the switching signal and said first bit;
 an adder circuit having inputs coupled to said control circuit and to said address register for receiving said address specifying data and said logic combination from said control circuit, said adder circuit having outputs providing an added signal obtained by combining the signals on said adder circuit inputs;

a first byte data memory means forming a first portion of the word data memory coupled to said adder circuit for receiving said added signal therefrom as an address within said first byte data memory means;

a second byte data memory means forming a second portion of the word data memory for receiving said address specifying data;

a data input switching means coupled to said first and second byte data memory means for selectively transferring thereinto word writing data and byte writing data from first bit lines and second bit lines of said CPU data bus; and a data output switching means for selectively providing data of the first and second byte data memory means onto the CPU data bus first and second bit lines.

2. A microprocessor according to claim 1, wherein the data input switching means comprises:

a first logical circuit connected to the CPU data bus for selectively transmitting data on the first bit lines of the CPU data bus;

a first gating means connected to the first logical circuit for transmitting data from the first logical circuit to the first byte data memory means;

a second logical circuit connected to the CPU data bus for transmitting data loaded on the second bit lines of the CPU data bus; and a second gating means connected to the second logical circuit for selectively transmitting data from the second logical circuit to the second byte data memory means.

3. A microprocessor according to the claim 1, wherein the data output switching means comprises:

a first gating means connected to the first byte data memory means for transmitting lower byte data to the CPU data bus, and a second gating means connected to the second byte data memory means for transmitting the upper byte data to the CPU data bus.

4. A microprocessor according to claim 1, wherein the control circuit is connected to the first and second byte data memories for generating an input control signal which transfers selectively word writing data or byte writing data on the first and second bit lines of the CPU data bus to the first and second byte memories.

5. A microprocessor according to claim 1, wherein the switching signal is a word/byte specifying signal.

6. A microprocessor according to claim 1, wherein the logical combination is the logical product of the switching signal and the first bit output.

7. A microprocessor according to claim 1, wherein the control circuit is coupled to receive a writing signal when data is written to the first and second byte data memory means.

8. A microprocessor according to claim 1, wherein the data output switching circuit is coupled to receive a reading signal when data is read from the first and second byte data memory means.

9. A microprocessor having a word data memory, said microprocessor comprising:

a CPU data bus having a plurality of first bit lines and second bit lines, the data bus having sufficient lines to carry an address signal having multiple bits;

an address register having inputs coupled to the CPU data bus, for storing all bits of an address signal on the CPU data bus in response to an address latching signal, the address register having outputs providing a first bit output and remaining bits, the remaining bits comprising address specifying data;

a control circuit coupled to receive said first bit output and a switching signal, the control circuit being operative to provide a logic combination of the switching signal and said first bit output, wherein the control circuit is connected to first and second byte data memories for generating an input control signal which transfers selectively wood writing data or byte writing data on the first and second bit lines of the CPU data bus to the first and second byte memories;

an adder circuit having inputs coupled to said control circuit and to said address register for receiving said address specifying data and said logic combination from said control circuit, said adder circuit having outputs providing an added signal obtained by combining the signals on said adder circuit inputs;

a first byte data memory means forming a first portion of the word data memory coupled to said adder circuit for receiving said added signal therefrom as an address within said first byte data memory means;

a second byte data memory means forming a second portion of the word data memory for receiving said address specifying data;

a data input switching means coupled to said first and second byte data memory means for selectively transferring thereinto word writing data and byte writing data from said CPU data bus first bit lines and second bit lines; wherein data input switching means further includes a first logical circuit connected to the CPU data bus for selectively transmitting data on the first bit lines of the CPU data bus, including a first gating means connected to the first logical circuit for transmitting data from the first logical circuit to the first byte data memory means, and a second logical circuit, connected to the CPU data bus for transmitting data loaded on the second bit lines of the CPU data bus, including a second gating means connected to the second logical circuit for selectively transmitting data from the second logical circuit to the second byte data memory means, and a data output switching means for selectively providing data of the first and second byte data memory means onto the CPU data bus first and second bit lines, wherein the data output switching means further comprises a first gating means connected to the first byte data memory means for transmitting data to the CPU data bus, and a second gating means connected to the second byte data memory means for transmitting data to the CPU data bus.

10. A method for storing data in a memory, said method comprising the steps of:

storing an address signal in response to an address latching signal;

providing a first bit output and a remaining bits output from stored address signal, the remaining bits output comprising address specifying data;

combining said first bit output with a switching signal to generate a logic combination;

adding the address specifying data and the logic combination;

applying said added signal as an address within a first byte data memory means;

applying the address specifying data to a second byte data memory means;

inputting word writing data and byte writing data from first bit lines and second bit lines of a CPU data bus;

outputting data of the first and second byte data memory means onto the first and second bit lines of the CPU data bus.

* * * * *